(12) United States Patent
Wilhelm

(10) Patent No.: US 12,082,555 B2
(45) Date of Patent: Sep. 10, 2024

(54) PET TOY

(71) Applicant: Doskocil Manufacturing Company, Inc., Arlington, TX (US)

(72) Inventor: Josiah Wilhelm, Fort Worth, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 62 days.

(21) Appl. No.: 17/085,855

(22) Filed: Oct. 30, 2020

(65) Prior Publication Data
US 2021/0235667 A1 Aug. 5, 2021

Related U.S. Application Data

(60) Provisional application No. 62/968,247, filed on Jan. 31, 2020.

(51) Int. Cl.
*A01K 15/02* (2006.01)
*B29D 99/00* (2010.01)

(52) U.S. Cl.
CPC ............ *A01K 15/025* (2013.01); *B29D 99/00* (2013.01)

(58) Field of Classification Search
CPC .... A01K 15/026; A01K 15/025; A63B 43/00; A63B 69/3655; A63B 69/3688; B29D 99/00; A61H 2015/0042; A61H 15/00
USPC ............ 119/707, 702; 473/351, 52; 601/113
See application file for complete search history.

(56) References Cited

U.S. PATENT DOCUMENTS

| | | | | |
|---|---|---|---|---|
| 4,153,248 A * | 5/1979 | Holmes | .................. | A63B 37/10 482/49 |
| 5,588,648 A * | 12/1996 | Stebbins | ................ | A63B 37/02 473/600 |
| 5,879,251 A * | 3/1999 | Rose | ...................... | A63B 65/00 473/576 |
| 6,354,970 B1 * | 3/2002 | Reinke | ............... | A63B 69/0002 473/600 |
| 9,635,837 B2 * | 5/2017 | Simon | ................... | A01K 15/026 |
| 10,206,373 B1 * | 2/2019 | Fincher | ................ | A01K 15/026 |
| 10,625,130 B1 * | 4/2020 | McDowell | ............. | A63B 59/30 |
| 2007/0155549 A1 * | 7/2007 | Keker | .................... | A63B 37/14 473/613 |
| 2012/0048251 A1 | 3/2012 | Oblack et al. | | |
| 2013/0095963 A1 * | 4/2013 | Smith | .................... | A63B 37/14 427/256 |
| 2014/0053787 A1 * | 2/2014 | Oblack | ................ | A01K 15/025 119/709 |

(Continued)

OTHER PUBLICATIONS

International Search Report and Written Opinion issued Apr. 14, 2021 in corresponding International Patent Application No. PCT/US2021/015668, filed Jan. 29, 2021.

(Continued)

*Primary Examiner* — Peter M Poon
*Assistant Examiner* — Jeffrey R Larsen
(74) *Attorney, Agent, or Firm* — GLOBAL IP COUNSELORS, LLP

(57) ABSTRACT

Pet toys for use with various launchers are described herein. In an example embodiment, a pet toy comprises a body including a first body portion and a second body portion. The first body portion is sized and configured to be positioned within a first launcher. The second body portion is sized and configured to be positioned within a second launcher. The second body portion is a different size than the first body portion.

16 Claims, 10 Drawing Sheets

(56) References Cited

U.S. PATENT DOCUMENTS

2015/0296747 A1    10/2015  Kellogg
2015/0342146 A1\*  12/2015  Tucker ................. A01K 15/025
                                                    124/79
2016/0255812 A1    9/2016  Wolfe, Jr. et al.
2018/0310527 A1\*  11/2018  Yang ...................... A01K 13/00
2019/0335713 A1\*  11/2019  Wills .................... A63B 59/20

OTHER PUBLICATIONS

Kong 2018 Product Catalog; www.KONGcompany.com; Kong Company; c. 2018.

\* cited by examiner

US 12,082,555 B2

PET TOY

PRIORITY

This patent application claims priority to U.S. Provisional Patent Application No. 62/968,247, filed Jan. 31, 2020 and entitled "Pet Toy," the entire contents of which are incorporated herein by reference and relied upon.

BACKGROUND

Field of the Invention

The present disclosure relates to a pet toy. In particular, the present disclosure relates to a pet toy that can be picked up and launched using a plurality of different sizes or types of launchers.

Background

Conventional pet toys which are used with launchers can have a variety of designs such as a ball or a ring. One example of such a pet toy is sold by the present assignee under the CHUCKIT! brand. The CHUCKIT! brand includes, for example, a generally spherical ball which can be picked up and launched by a launcher which has a cup-shaped head portion. The CHUCKIT! brand includes several different sizes of generally spherical balls, which are each used with a correspondingly sized launcher.

SUMMARY

The present disclosure provides an improved pet toy that is capable of being used with a plurality of different types or sizes of launchers and/or which bounces in unpredictable directions when being launched and chased by a pet.

In view of the state of the known technology, one aspect of the present disclosure is to provide a pet toy comprising a body including a first body portion and a second body portion. The first body portion is sized and configured to be positioned within a first launcher. The second body portion is sized and configured to be positioned within a second launcher. The second body portion is a different size than the first body portion.

In accordance with a second aspect of the present disclosure, which can be combined with any other aspect described herein, the first body portion includes a first spherical cap having a first diameter, the second body portion includes a second spherical cap having a second diameter, and the second diameter is larger than the first diameter.

In accordance with a third aspect of the present disclosure, which can be combined with any other aspect described herein, the ratio of the first diameter to the second diameter is about 4:5.

In accordance with a fourth aspect of the present disclosure, which can be combined with any other aspect described herein, the first body portion forms a convex spherical surface on one side of the body, the second body portion forms a convex spherical surface on an opposite side of the body, and the body further includes an intermediate portion located between the first body portion and the second body portion, the intermediate portion forming a concave surface between the convex spherical surfaces of the first body portion and the second body portion.

In accordance with a fifth aspect of the present disclosure, which can be combined with any other aspect described herein, the first body portion and the second body portion are the only bulbous portions on the body.

In accordance with a sixth aspect of the present disclosure, which can be combined with any other aspect described herein, the first body portion and the second body portion are formed by a first section and a second section, the first body portion formed by a first portion of the first section and a first portion of the second section, the second body portion formed by a second portion of the first section and a second portion of the second section.

In accordance with a seventh aspect of the present disclosure, which can be combined with any other aspect described herein, the first section and the second section are connected by at least one connecting piece, and the body includes at least one aperture between the first section and the second section.

In accordance with an eighth aspect of the present disclosure, which can be combined with any other aspect described herein, the first body portion has a first diameter, the second body portion has a second diameter which is larger than the first diameter, and the body has a height which is larger than each of the first diameter and the second diameter, and is also smaller than the combination of the first diameter and the second diameter.

In accordance with a ninth aspect of the present disclosure, which can be combined with any other aspect described herein, a system includes the pet toy and at least one of the first launcher and the second launcher.

In accordance with a tenth aspect of the present disclosure, which can be combined with any other aspect described herein, a pet toy comprises a body including a first section and a second section. Each of the first section and the second section includes a first portion and a second portion. The first section and the second section form a first body portion and a second body portion which are different sizes, the first body portion formed by the first portion of the first section and the first portion of the second section, the second body portion formed by the second portion of the first section and the second portion of the second section.

In accordance with an eleventh aspect of the present disclosure, which can be combined with any other aspect described herein, the first section and the second section are separate pieces which are attached to each other.

In accordance with a twelfth aspect of the present disclosure, which can be combined with any other aspect described herein, the first section and the second section have been manufactured as one unitary piece.

In accordance with a thirteenth aspect of the present disclosure, which can be combined with any other aspect described herein, the first body portion includes a first spherical cap having a first diameter, the second body portion includes a second spherical cap having a second diameter, and the second diameter is larger than the first diameter.

In accordance with a fourteenth aspect of the present disclosure, which can be combined with any other aspect described herein, the first section and the second section are connected by at least one connecting piece, and the body includes at least one aperture between the first section and the second section.

In accordance with a fifteenth aspect of the present disclosure, which can be combined with any other aspect described herein, a method of making a pet toy comprises: molding a first section, the first section having a first portion and a second portion; molding a second section, the second section having a first portion and a second portion; and forming a body with the first section and the second section, the body having first body portion formed by the first portion of the first section and the first portion of the second section and a second body portion formed by the second portion of the first section and the second portion of the second section, the second body portion being larger than the first body portion.

In accordance with a sixteenth aspect of the present disclosure, which can be combined with any other aspect described herein, forming the body includes simultaneously molding the first section and the second section as one unitary piece.

In accordance with a seventeenth aspect of the present disclosure, which can be combined with any other aspect described herein, molding the second section includes molding the second section separately from the first section, and forming the body includes joining the first section to the second section.

In accordance with an eighteenth aspect of the present disclosure, which can be combined with any other aspect described herein, molding the first section includes molding the first section within a first half of a mold, molding the second section includes molding the second section within a second half of the mold, and forming the body includes forming the first section and the second section together between the first half and the second half of the mold.

In accordance with a nineteenth aspect of the present disclosure, which can be combined with any other aspect described herein, forming the body includes forming the first body portion to have a first diameter and the second body portion to have a second diameter, the second diameter being larger than the first diameter.

In accordance with a twentieth aspect of the present disclosure, which can be combined with any other aspect described herein, forming the body includes forming a connecting piece between the first section and the second section such that the body includes at least one aperture between the first section and the second section.

BRIEF DESCRIPTION OF THE DRAWINGS

Referring now to the attached drawings which form a part of this original disclosure.

DETAILED DESCRIPTION

Figure 1:
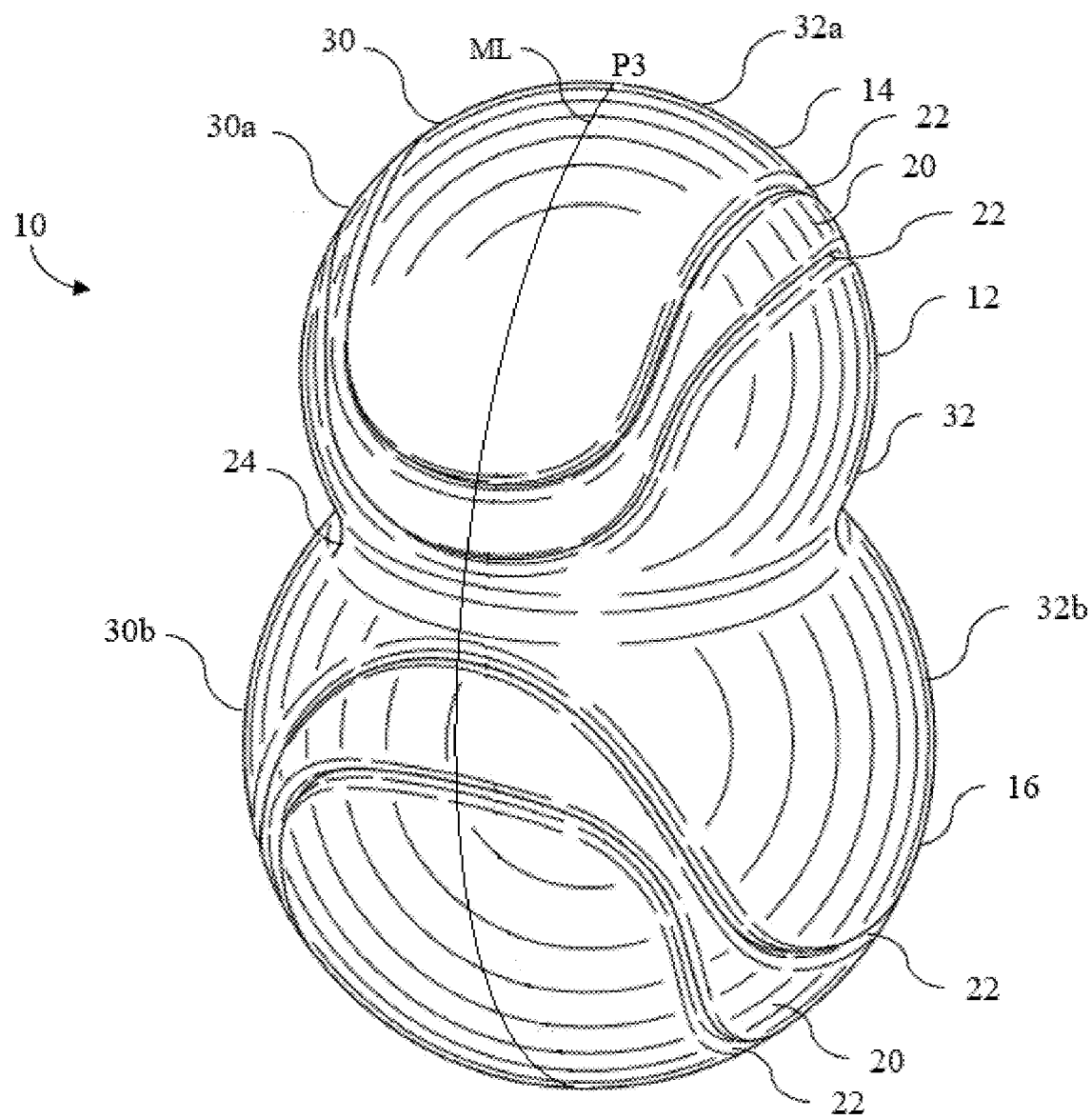
FIG. 1 illustrates a front perspective view of an example embodiment of a pet toy according to the present disclosure.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

FIGS. 1 to 5 illustrate a first example embodiment of a pet toy 10 in accordance with the present disclosure. In the illustrated embodiment, the pet toy 10 includes a body 12 having a first body portion 14 and a second body portion 16. As explained in more detail below, the pet toy 10 is configured for use with a plurality of differently sized launchers L. For example, the first body portion 14 is configured to be gripped and launched by a first launcher L1, and the second body portion 16 is configured to be gripped and launched by a second launcher L2.

Each of the first body portion 14 and the second body portion 16 can be generally circular and/or form at least half of a sphere. As should be appreciated from this disclosure, however, the first body portion 14 and the second body portion 16 are not necessarily completely circular or spherical, for example, since the area in which they meet is flattened. More specifically, the first body portion 14 can include a first spherical cap in which a section of a sphere is cut off by a plane to form the flattened section. Likewise, the second body portion 16 can include a second spherical cap in which a section of a sphere is cut off by a plane to form the flattened section. As illustrated, each section of a sphere cut off by a plane can be less than half of the original sphere (e.g., less than a hemisphere), thus making each spherical cap more than half of the sphere (e.g., more than a hemisphere). Thus, as illustrated, the first body portion 14 and the second body portion 16 can form a "snowman" shape in which the first body portion 14 is a generally spherical cap with a first diameter D1 and the second body portion 16 is a generally spherical cap with a second diameter D2.

In the illustrated embodiment, the first body portion 14 includes a first spherical cap which has a first diameter D1 and a first height H1. The first height H1 extends perpendicular to a first plane P1 which cuts off the sphere to form the flattened section and bound the first spherical cap. In the illustrated embodiment, the first height H1 is the vertical distance between the first plane P1 and the top of the first body portion 14 (e.g., at point p2). The first diameter D1 is taken parallel to the first plane P1 through what would be the center point C1 of the full sphere. The first diameter D1 is also taken at the widest section of the first body portion 14 from the perspective of the top view in FIG. 4. The first diameter D1 can also be referred to as the first width of the first body portion 14. The first body portion 14 further includes a first radius R1 (e.g., half of the first diameter D1) which defines the spherical outer contour of the first body portion 14. That is, the distance from the center point C1 to various example points p1, p2, p3 on the outer surface of the first body portion 14 is the same radius R1, giving the outer surface of the first body portion 14 the same general curvature at all points.

Likewise, the second body portion 16 includes a second spherical cap which has a second diameter D2 and a second height H2. The second height H2 extends perpendicular to a second plane P2 which cuts off the sphere to form the flattened section and bound the second spherical cap. In the illustrated embodiment, the second height H2 is the vertical distance between the second plane P2 and the bottom of the second body portion 16 (e.g., at point p5). The second diameter D2 is taken parallel to the second plane P2 through what would be the center point C2 of the full sphere. The second diameter D2 is also taken at the widest section of the second body portion 16 from the perspective of the bottom view in FIG. 5. The second diameter D2 can also be referred to as the second width of the second body portion 16. The second body portion 16 further includes a second radius R2 (e.g., half of the second diameter D2) which defines the spherical outer contour of the second body portion 14. That is, the distance from the center point C2 to various points p4, p5, p6 on the outer surface of the second body portion 16 is the same radius R2, giving the outer surface of the second body portion 16 the same general curvature at all points.

To create the illustrated "snowman" shape, the first body portion 14 and the second body portion 16 can be arranged such that the cut-off sections of the spherical caps would overlap, with the first plane P1 and the second plane P2 located parallel to each other on the inside of the pet toy 10. Thus, the spherical caps of the first body portion 14 and the second body portion 16 face outwardly from the pet toy 10. For example, the first spherical cap of the first body portion 14 defines the top (or first side) of the pet toy 10, and the second spherical cap 16 of the second body portion 16 defines the bottom (or opposite second side) of the pet toy 10.

The relative sizes of the first body portion 14 and the second body portion 16 can vary. As illustrated, the second diameter D2 of the second body portion 16 can be different from the first diameter D1 of the first body portion 14. More specifically, the second diameter D2 is larger than the first diameter D1. In the illustrated embodiment, the ratio of the first diameter D1 to the second diameter D2 is about 4:5. Accordingly, in various embodiments, the ratio of the first diameter D1 to the second diameter D2 can be, for example, between about 3:10 and about 9:10, preferably between about 6:10 and about 9:10, more preferably about 4:5.

One or both of the first body portion 14 and the second body portion 16 can include one or more design portion 20, for example, which improves the aesthetics of the pet toy 10. In the illustrated embodiment, each of the first body portion 14 and the second body portion 16 includes a design portion 20, which is shown as a ribbon shape which curves around the outer surface of the first body portion 14 or the second body portion 16 similar to the threads of a baseball. Any design portion 20 can include an indentation or protrusion 22 which alters the surface of the first body portion 14 or the second body portion 16. Thus, in an embodiment, all points on the outer surface of the first body portion 14 which are not related to a design portion 20 can be generally located at the first radius R1 from the center point C1, and/or all points on the outer surface of the second body portion 16 which are not related to a design portion 20 can be generally located at the second radius R2 from the center point C2.

In the illustrated embodiment, the body 12 further includes an intermediate portion 24 located between the first body portion 14 and the second body portion 16. Here, the intermediate portion 24 curves inwardly in comparison to the outward curves of the respective spherical caps of the first body portion 14 and the second body portion 16. In other words, the intermediate portion 24 has a concave contour from the perspective of FIGS. 2 and 3, while the first body portion 14 and the second body portion 16 have a convex contour from the same perspective. In an alternative embodiment, the intermediate portion 24 can be eliminated and the first body portion 14 can be located directly adjacent to the second body portion 16 without a noticeable intermediate portion 24. In this embodiment, for example, the first plane P1 and the second plane P2 can be parallel and overlap.

Figure 2:
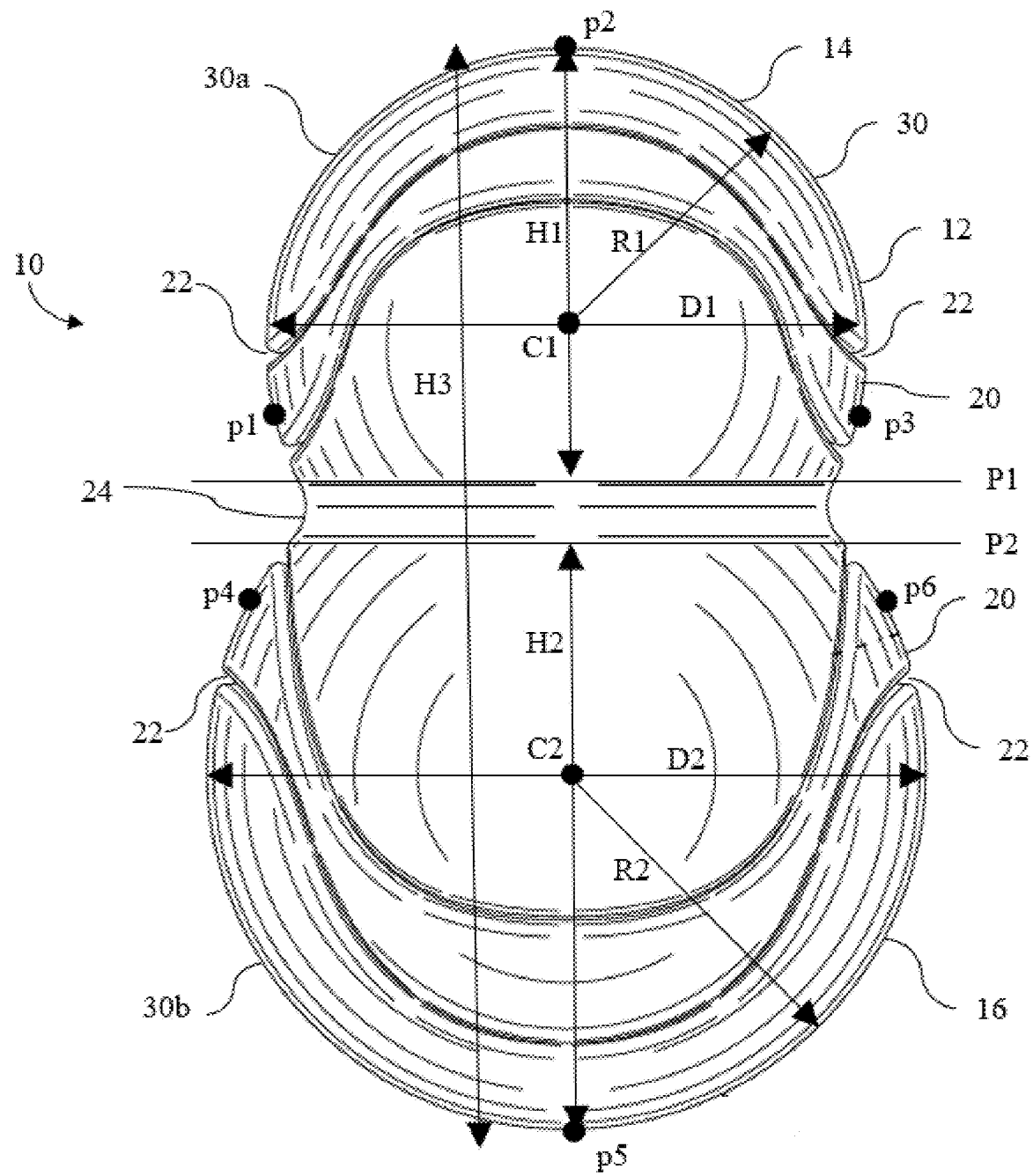
FIG. 2 illustrates a side elevational view of the pet toy of FIG. 1.
Figure 3:
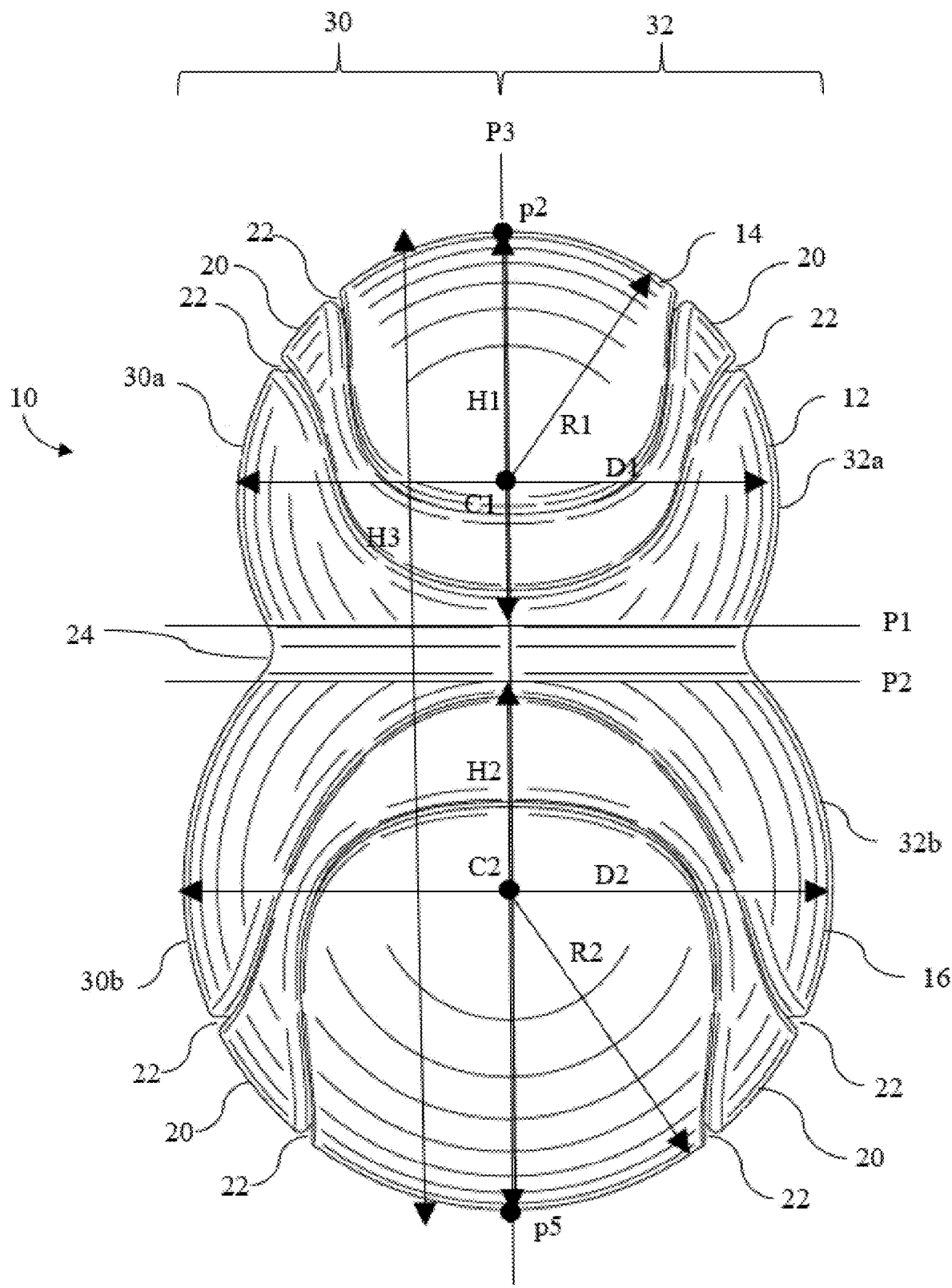
FIG. 3 illustrates another side elevational view of the pet toy of FIG. 1, wherein the pet toy has been rotated 90 degrees about a vertical axis through the center thereof in comparison to FIG. 2.
Figure 4:
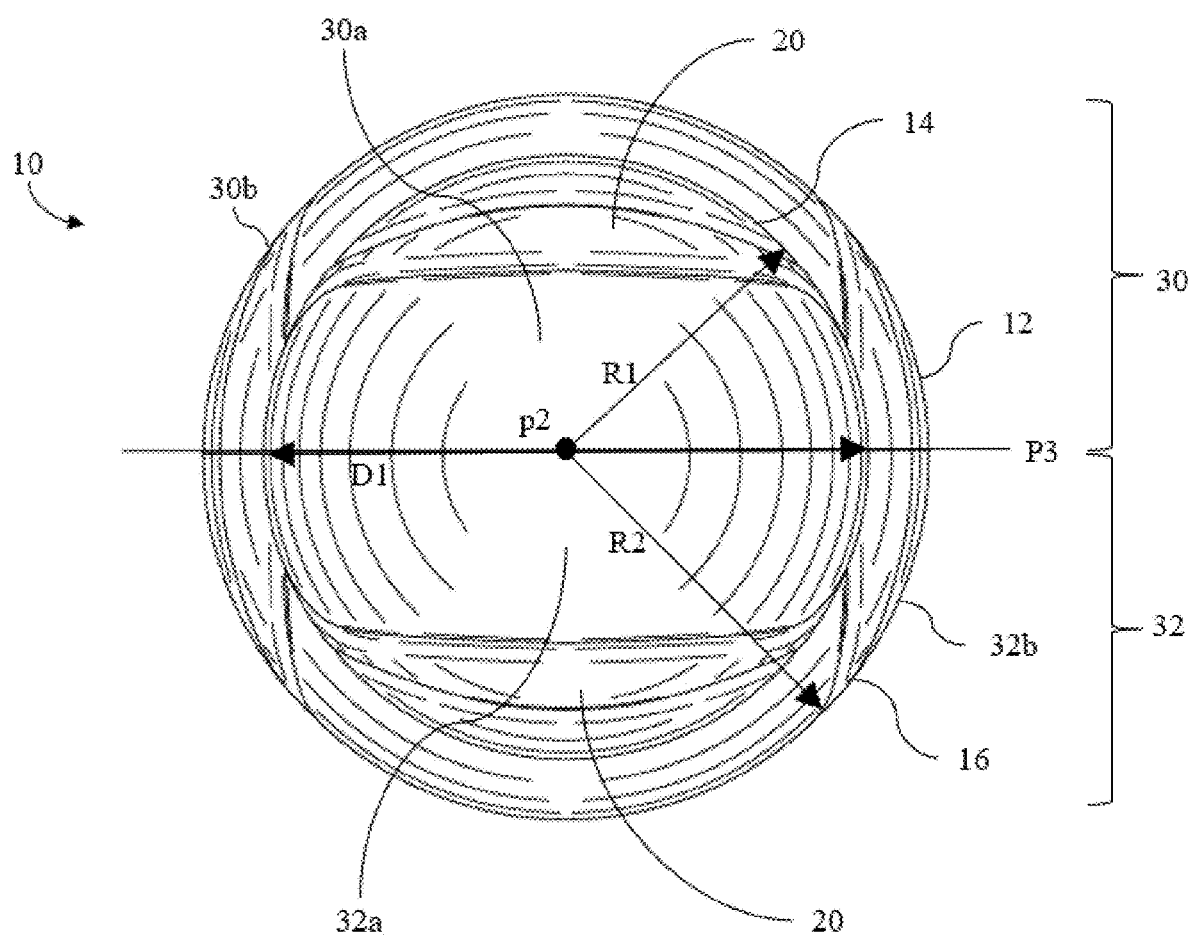
FIG. 4 illustrates a top plan view of the pet toy of FIG. 1.
Figure 5:
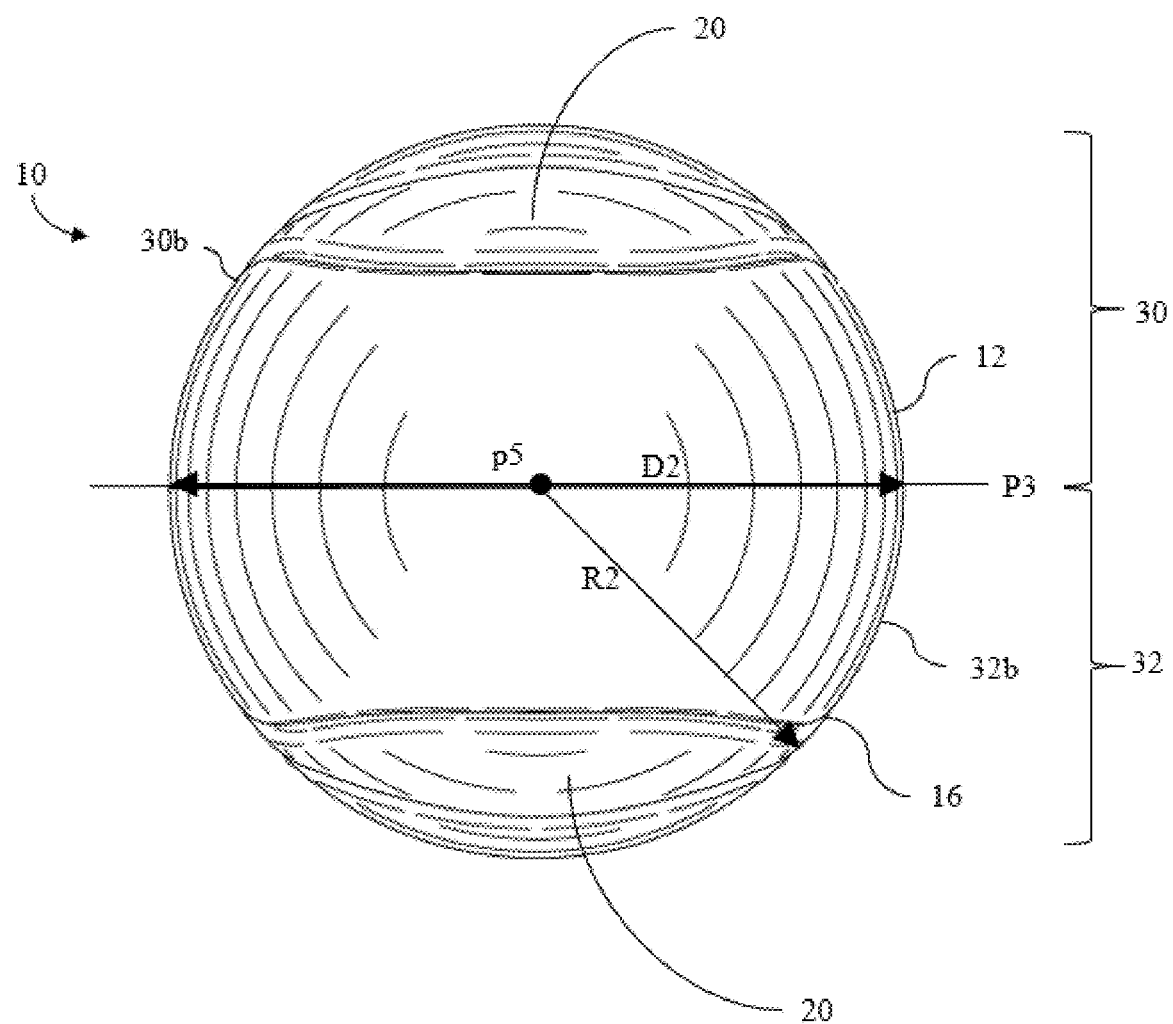
FIG. 5 illustrates a bottom plan view of the pet toy of FIG. 1.

In FIGS. 2 and 3, the body 12 has a longest height H3 which extends from top to bottom, e.g., from the point p2 at the top of the first body portion 14 to the point p5 at the bottom of the second body portion 16. The longest height H3 can be larger than each of the first diameter D1 or the second diameter D2, while also being smaller than the combination of the first diameter D1 and the second diameter D2.

In the illustrated embodiment, the first body portion 14 and the second body portion 16 are the only bulbous portions on the pet toy 10. That is, there are only two convex portions from the perspective of FIGS. 2 and 3, with one convex portion formed by the first body portion 14 and one convex portion formed by the second body portion 16. Put another way, the first body portion 14 includes a convex portion with a generally constant curvature from the side at point p1, to the top at point p2, to the opposite side at point p3. Likewise, the second body portion 16 includes a convex portion with a generally constant curvature from the side at point p4, to the bottom at point p5, to the opposite side at point p6. The first body portion 14 and the second body portion 16, which extend across the top and bottom of the pet toy 10, respectively, can be the only convex portions from the perspective of FIGS. 2 and 3, with no convex portion located inbetween.

In an embodiment, the body 12 can be a solid structure which is formed, for example, from an elastic material which can be deformed when squeezed, for example, from a synthetic rubber, rubber, copolymer, resin-based material, plastic and/or foam material. For example, the body 12 can be formed from a single elastic material which leaves no hollow inner portion therein. The body 12 can be initially molded as a unitary solid structure, or can be formed using separate pieces which are then attached.

Thus, each of the first body portion 14 and the second body portion 16 can be formed from an elastic material which can be deformed when squeezed, for example, from a synthetic rubber, rubber, copolymer, resin-based material, plastic and/or foam material. The first body portion 14 can include the same material as the second body portion 16. Alternatively, various embodiments may have a first body portion 14 which includes a different material than a second body portion 16, or a second body portion 16 which includes a different material than a first body portion 14. The different material can have a different weight, density and/or flexibility than another material used to form the body 12. In another embodiment, the inner and outer portions of the body 12 can be formed from a plurality of materials. For example, the outer surface of the body 12 can be formed from a first material, and the inner portion of the body can be formed from a second material which has a different weight, density and/or flexibility as the first material.

In another embodiment, the body 12 can be a hollow body structure that when squeezed enables the first body portion 14 and/or the second body portion 16 to slightly deform or be compressed. In this embodiment, the outer surface of the body 12 which creates a hollow inner portion can be formed, for example, from an elastic material which can be deformed when squeezed, for example, from a synthetic rubber, rubber, copolymer, resin-based material, plastic and/or foam material. In this embodiment, the hollow inner portion of the body 12 can be sealed from the outside environment by the outer surfaces of the first body portion 14 and the second body portion 16. That is, each of the first body portion 14 and the second body portion 16 can include an outer surface which does not include an aperture. The first body portion 14 can seal the top (or first side) of the hollow inner portion from the perspective of FIGS. 2 and 3, and the second body portion 16 can seal the bottom (or opposite second side) of the hollow inner portion from the same perspective. Thus, in this embodiment, a user cannot place a substance (e.g., peanut butter or another pet snack) inside of the hollow inner portion of the body 12 without damaging the pet toy 10. Likewise, a pet cannot force a foreign substance into the inside of the hollow inner portion of the body 12 without damaging the pet toy 10.

The first body portion 14 can be attached to the second body portion 16 in a variety of ways. In an embodiment, the body 12 can include a first section 30 and a second section 32. The body 12 can be formed by forming the first section 30 and the second section 32 as a single unitary piece. In an embodiment, the body 12 can be formed by joining the first section 30 to the second section 32, for example, via an adhesive or heat welding. Each of the first section 30 and the second section 32 can form approximately half of the body 12 on opposite sides of a plane P3 through the center of the body 12 along the longest height H3. As seen in FIGS. 1, 3, 4 and 5, the first section 30 can be the section of the body 12 on one side of the plane P3 which intersects the center of the body 12 (e.g., the vertical plane P3 in FIGS. 1 and 3, shown horizontally in FIGS. 4 and 5), and the second section 32 can be the section of the body 12 on the opposite side of the plane P3. Thus, the first section 30 can include a first portion 30a (e.g., half) of the first body portion 14 and a second portion 30b (e.g., half) of the second body portion 16. Likewise, the second section 32 can include a first portion 32a (e.g., half) of the first body portion 14 and a second portion 32b (e.g., half) of the second body portion 16.

The first section 30 and the second section 32 can be formed, for example, from an elastic material such as synthetic rubber, rubber, copolymer, resin-based material, plastic and/or foam material. The first section 30 and the second section 32 can be molded in any suitable manner, for example, by injection molding, compression molding, or other methods. In one embodiment, the first section 30 and the second section 32 can be molded as a unitary solid structure using one or more outer molds. In another embodiment, the first section 30 and the second section 32 can be molded as separate solid structures using one or more outer molds, and can then be joined. In another embodiment, the first section 30 and the second section 32 can each be molded using an inner mold and an outer mold, and can then be attached to form a body 12 with a hollow interior portion where the inner mold was located. In this embodiment, the inner mold can be removed from each section 30, 32 while the material is still hot, with the material elastically stretching and then returning to form. It should be understood from this disclosure that the first section 30 and the second section 32 can also be formed in other suitable manners beside molding.

In an embodiment, the first section 30 and the second section 32 can be identical and/or can be molded using the same mold(s), thus simplifying the manufacturing process. It should be understood from this disclosure, however, that the first section 30 and the second section 32 can also be molded from different molds and/or can be made from substantially the same or different materials. In an alternative embodiment, the plane P3 can be located between the first body portion 14 and the second body portion 16 (e.g., can be a horizontal plane in FIG. 3), such that the first section 30 includes one of the first body portion 14 and the second body portion 16, and the second section 32 includes the other of the first body portion 14 and the second body portion 16. However, by locating the plane P3 in a vertical manner as shown such that the first section 30 and the second section 32 each include a portion of a first body portion 14 and a portion of a second body portion 16, the first body portion 14 and the second body portion 16 are less likely to be separated (e.g., torn or chewed apart) by an aggressive pet.

In an embodiment, the first body portion 14 and the second body portion 16 can be simultaneously molded together, such that they are removed from a mold as one unitary piece. For example, the first section 30 and the second section 32 can be molded within a mold having two similar halves. One half of the mold can form the first section 30, and the other half of the mold can form the second section 32. The mold halves can meet along the plane P3 to form the first section 30 and the second section 32 together as a unitary piece. The mold line ML shown in FIG. 1 can be present on the body 12 as seepage from the mold halves where the mold halves meet.

In another embodiment, the first section 30 and the second section 32 can be molded separately using identical molds and/or the same mold(s), and can then be joined in a suitable manner. In an embodiment, the first section 30 can be attached to the second section 32 via an adhesive (e.g., non-toxic glue). The adhesive can be applied to attach the first section 30 to the second section 32 along the plane P3 to form the body 12 of the pet toy 10. In another embodiment, the first section 30 can be attached to the second section 32 via heat welding. For example, the first section 30 and the second section 32 can be pressed together at the plane P3 and heat welded where they meet at the plane P3.

Thus, the pet toy 10 can be formed by: molding a first section 30, the first section 30 having a first portion 30a and a second portion 30b; molding a second section 32, the second section 32 having a first portion 32a and a second portion 32b; and forming a body 12, the body having a first body portion 14 formed by the first portion 30a of the first section 30 and the first portion 32a of the second section 32 and a second body portion 16 formed by the second portion 30b of the first section 30 and the second portion 32b of the second section 32. Forming the body can include simultaneously molding the first section 30 and the second section 32 as one unitary piece. For example, the first section 30 can be molded within a first half of a mold, the second section 32 can be molded within a second half of the mold, and the body can be formed by the first section 30 and the second section 32 being formed together between the first half and the second half of the mold. Forming the body 12 can also include separately molding the first section 30 and the second section 32 and then joining the first section 30 to the second section 32, for example, via an adhesive or heat welding. It should be understood from this disclosure that the first section 30 and the second section 32 can be formed or joined in any suitable manner to form any desired configuration or design.

Figure 6:
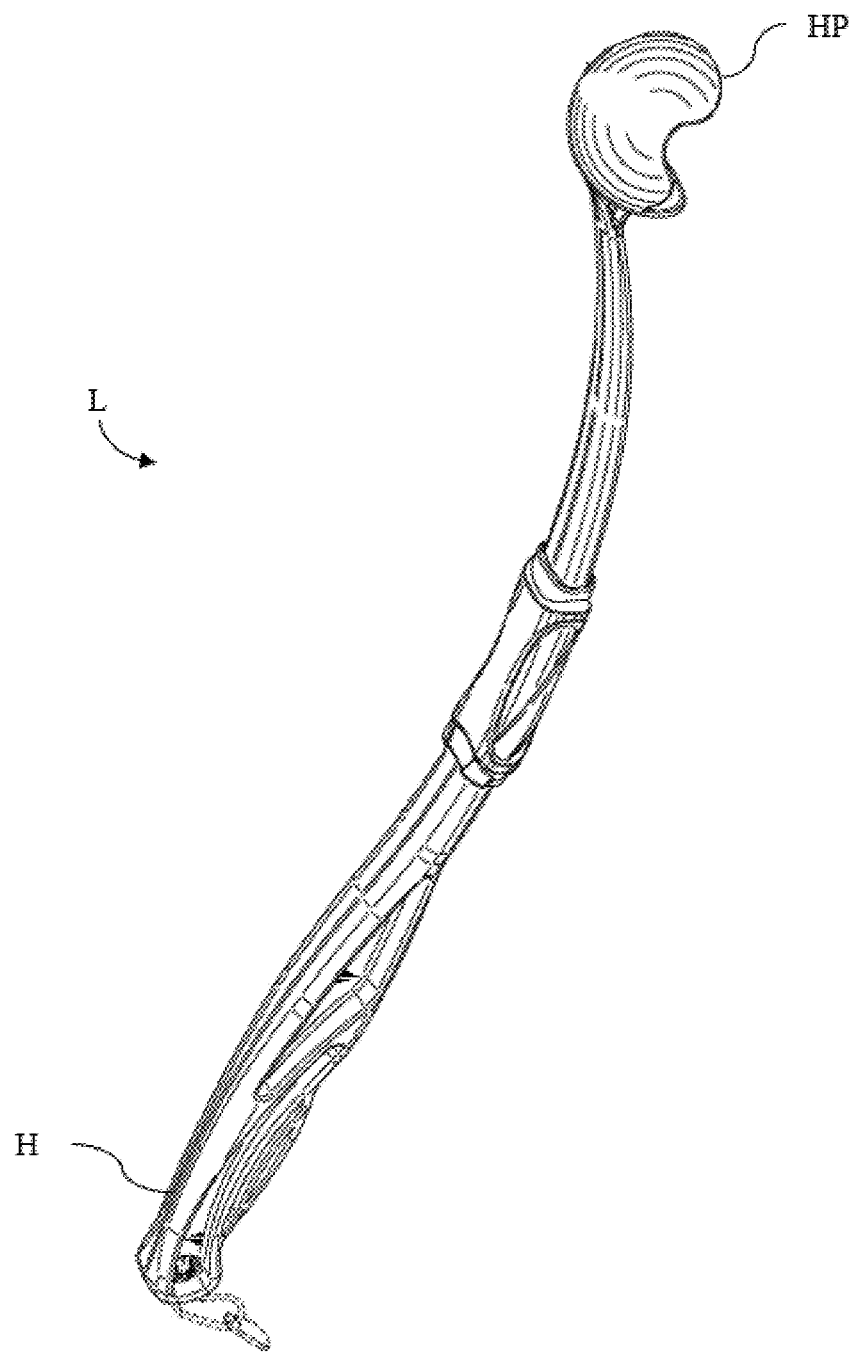
FIG. 6 illustrates a side perspective view of an example embodiment of a launcher which can be used in conjunction with the pet toy of FIG. 1.

FIG. 6 illustrates an example embodiment of a launcher L which can be used with the pet toy 10. The launcher L can be any suitable launcher, for example, a launcher sold by the present assignee under the CHUCKIT! brand. An example embodiment of a launcher L is illustrated and described in U.S. Pat. No. 6,076,829, the entire contents of which is incorporated herein by reference and relied upon.

In the illustrated embodiment, the launcher L includes a handle H and a head portion HP. The handle H is configured to be gripped by a user, while the head portion HP is cupped and/or generally spherical so as to be capable of receiving a ball or partially spherical object therein. The head portion HP includes an aperture which is sized and shaped to receive the ball or other spherical object. Once received within the aperture, the head portion HP can grip the ball or other spherical object with an interference fit (e.g., a press fit, a friction fit, a snap fit, etc.) or in any other suitable manner. Thus, the launcher L is capable of picking up a ball or other spherical object without the user using his or her hands, for example, by the user gripping the handle H and forcing the head portion HP onto the ball or other spherical object.

Thus, the pet toy 10 described herein can be used by a user who already owns at least one of a plurality of launchers L. That is, the pet toy 10 is enabled for use with a launcher L which has been previously configured to be used with a ball or other spherical object. Since the pet toy 10 has multiple body portions 14, 16 with differing diameters D1, D2, the pet toy 10 can be used with various differently sized launchers L. A user can pick up the pet toy 10 using a launcher L and grip the pet toy 10 without touching the pet toy 10. This aspect of the disclosure enables the user to avoid animal slobber and quickly and easily pick up the pet toy 10 using various differently sized launchers L.

Figure 7:
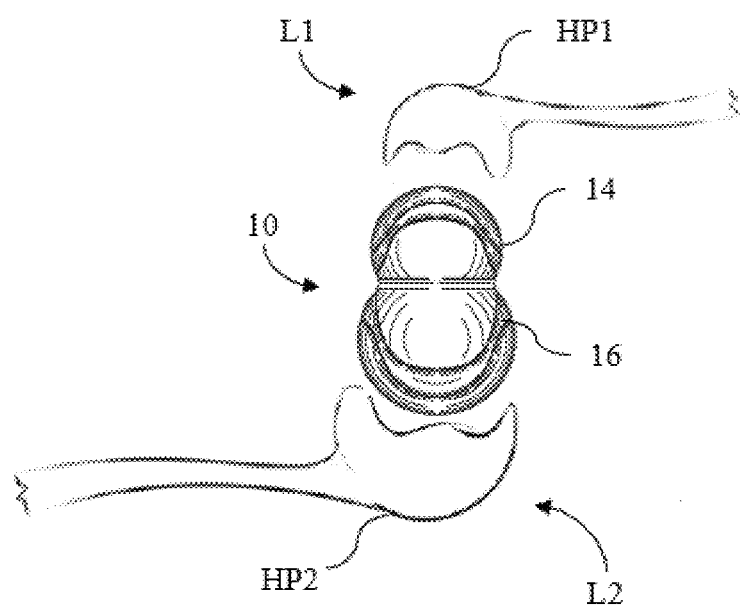
FIG. 7 illustrates how two differently sized launchers can be used in conjunction with the pet toy of FIG. 1.

FIG. 7 illustrates an example embodiment of a system S which includes a pet toy 10 and a plurality of launchers L. More specifically, the system S includes a pet toy 10, a first launcher L1, and a second launcher L2. The first launcher L1 and the second launcher L2 can have different sizes of head portions HP which are configured to receive differing diameters of spherical objects. As illustrated, the first body portion 14 of the pet toy 10 has a first diameter D1, such that the first body portion 14 is sized and configured to be received or positioned within the first head portion HP1 of the first launcher L1. The second body portion 16 of the pet toy 10 has a second diameter D2, such that the second body portion 16 is sized and configured to be received or positioned within the second head portion HP2 of the second launcher L2.

The first launcher L1 has a first head portion HP1 with an aperture which is configured to receive and/or grip the first body portion 14. The aperture can have a width of about the first diameter D1 of the first body portion 14 of the pet toy 10. This allows the first head portion HP1 to be forced onto the first body portion 14 by a user pressing the first head portion HP1 onto the first body portion 14, thus causing an interference fit which holds the pet toy 10 within the first head portion HP1 until the user launches the pet toy 10 with a throwing motion.

The second launcher L2 has a second head portion HP2 with an aperture which is configured to receive and/or grip the second body portion 16. The aperture can have a width of about the second diameter D2 of the second body portion 16 of the pet toy 10. This allows the second head portion HP2 to be forced onto the second body portion 16 by a user pressing the second head portion HP2 onto the second body portion 16, thus causing an interference fit which holds the pet toy 10 within the second head portion HP2 until the user launches the pet toy 10 with a throwing motion.

Another advantage to the shape of the pet toy 10 shown in FIGS. 1 to 5 is that the pet toy 10 bounces in an unpredictable manner when being launched by the user and thereafter chased by a pet. A typical ball will bounce and roll generally in a straight line due to its symmetrical nature, thus enabling a pet to recover the ball with ease. The pet toy 10 of the present disclosure, on the other hand, will bounce and roll randomly, thus forcing the pet to exert more effort during a throw-and-fetch game.

Figure 8:
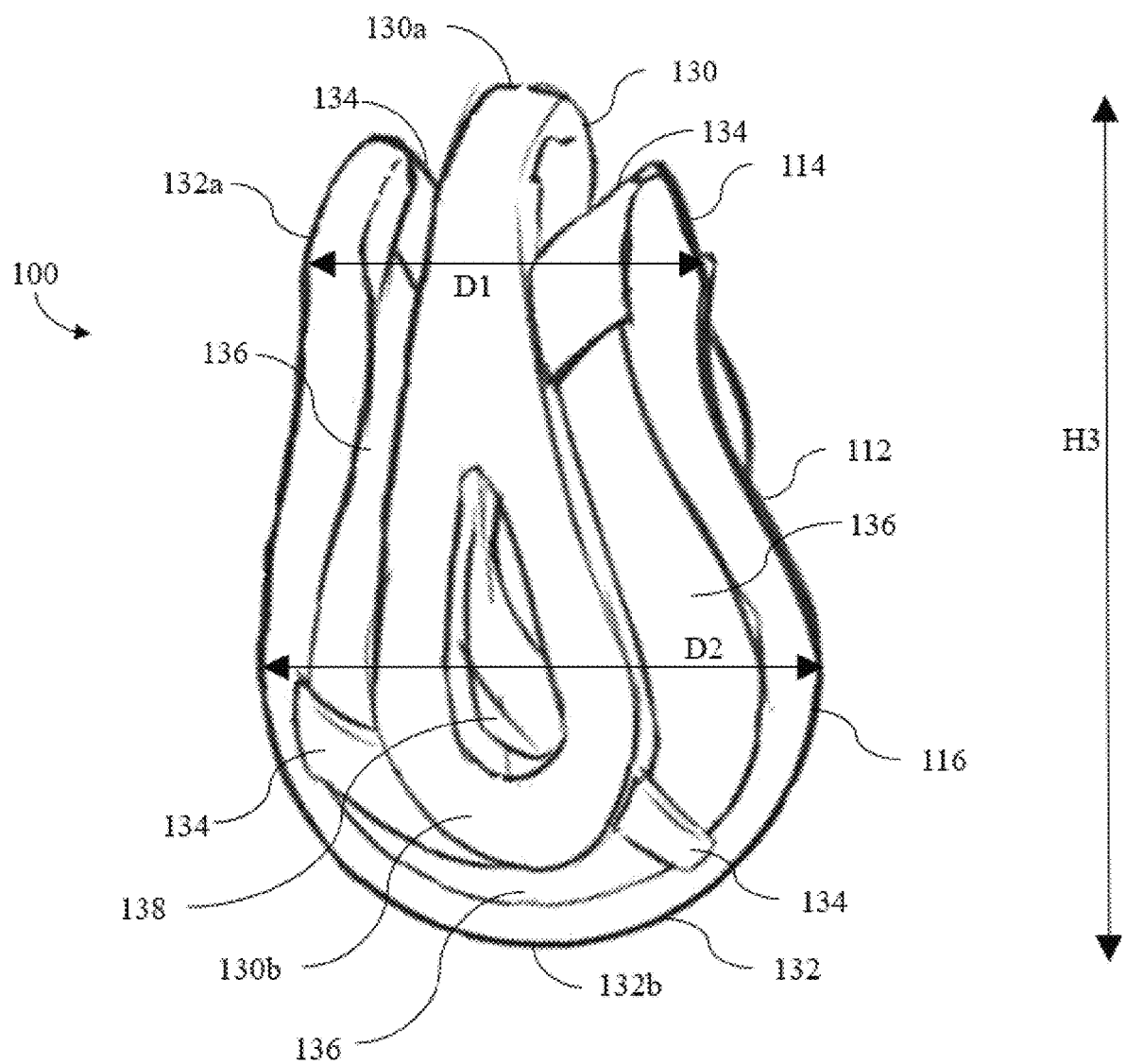
FIG. 8 illustrates a front perspective view of another example embodiment of a pet toy according to the present disclosure.

FIG. 8 illustrates a second example embodiment of a pet toy 100 in accordance with the present disclosure. For simplicity, the pet toy 100 is described with similar reference numerals as the pet toy 10 to show like elements (e.g., bodies 12 and 112). Thus, in FIG. 8, the pet toy 100 includes a body 112 having a first body portion 114 and a second body portion 116. Like with the pet toy 10, the pet toy 100 is configured for use with a plurality of differently sized launchers L. For example, the first body portion 114 is configured to be gripped and launched by a first launcher L1, and the second body portion 116 is configured to be gripped and launched by a second launcher L2. In an embodiment, the opposite side of the pet toy 100 not shown in FIG. 8 can look the same as the side shown in FIG. 8.

Like with the first body portion 14 of the pet toy 10, the first body portion 114 can include a first diameter D1. From a top view, the first body portion 114 can be generally circular. The first diameter D1 can taken at the widest section of the first body portion 114 from the perspective of the top view. The first diameter D1 can also be referred to as the first width of the first body portion 114. Also like with the first body portion 14 of the pet toy 10, the first body portion 114 can include a first height (not labeled) which can be perpendicular to the direction the first diameter D1 has been taken (e.g., the first height can be vertical in FIG. 8).

Like with the second body portion 16 of the pet toy 10, the second body portion 116 can include a second diameter D2. From a bottom view, the second body portion 116 can be generally circular. The second diameter D2 can be taken at the widest section of the second body portion 116 from the perspective of the bottom view. The second diameter D2 can also be referred to as the second width of the second body portion 116. Also like with the second body portion 16 of the pet toy 10, the second body portion 116 can include a second height (not labeled) which can be perpendicular to the direction the second diameter D2 has been taken (e.g., the second height can be vertical in FIG. 8).

The relative sizes of the first body portion 114 and the second body portion 116 can vary. As illustrated, the second diameter D2 of the second body portion 116 can be different from the first diameter D1 of the first body portion 114. More specifically, the second diameter D2 is larger than the first diameter D1. In the illustrated embodiment, the ratio of the first diameter D1 to the second diameter D2 is about 4:5. Accordingly, in various embodiments, the ratio of the first diameter D1 to the second diameter D2 can be, for example, between about 3:10 and about 9:10, preferably between about 6:10 and about 9:10, more preferably about 4:5.

The body 112 can have a longest height H3 which extends from top to bottom from the perspective of FIG. 8. The longest height H3 can be larger than each of the first diameter D1 or the second diameter D2, while also being smaller than the combination of the first diameter D1 and the second diameter D2.

The body 112 can be formed, for example, from an elastic material which can be deformed when squeezed, for example, from a synthetic rubber, rubber, copolymer, resin-based material, plastic and/or foam material. Thus, each of the first body portion 114 and the second body portion 116 can be formed from an elastic material which can be deformed when squeezed, for example, from a synthetic rubber, rubber, copolymer, resin-based material, plastic and/or foam material. The first body portion 114 can include the same material as the second body portion 116. Alternatively, various embodiments may have a first body portion 114 which includes a different material than a second body portion 116, or a second body portion 116 which includes a different material than a first body portion 114.

As illustrated in FIG. 8, the pet toy 100 can have sections with a non-spherical structure and/or a mesh style surface. The mesh style surface can be formed, for example, by forming the first body portion 114 and second body portion 116 using a first section 130 and a second section 132. The first section 130 can include a first portion 130a of the first body portion 114 and a second portion 130b of the second body portion 16. Likewise, the second section 132 can include a first portion 132a of the first body portion 114 and a second portion 132b of the second body portion 116.

The first section 130 and the second section 132 can be connected, for example, via one or more connecting pieces 134. In the illustrated embodiment, the first section 130 includes at least one connecting piece 134 which connects the first portion 130a of the first body portion 114 to the first portion 132a of the first body portion 114. The second section 132 includes at least one connecting piece 134 which connects the second portion 130b of the second body portion 116 to the second portion 132b of the second body portion 116. More specifically, the first section 130 includes a plurality of connecting pieces 134 which connect the first portion 130a of the first body portion 114 to the first portion 132a of the first body portion 114. Likewise, the second section 132 includes a plurality of connecting pieces 134 which connect the second portion 130b of the second body portion 116 to the second portion 132b of the second body portion 116. In an alternative embodiment, the first section 130 can attach directly to the second section 132, for example, via an adhesive or by molding the sections directly together.

When formed as shown, the first section 130 and the second section 132 create connected strips of material and apertures 136, 138. More specifically, the body 112 can include one or more apertures 136 formed between the first section 130 and the second section 132. That is, both the first section 130 and the second section 132 can form at least part of an outer boundary of an aperture 136. One or more connecting piece 134 can also form at least part of an outer boundary of an aperture 136. The body 112 can also include one more apertures 138 within one or both of the first section 130 and/or the second section 132. That is, the first section 130 can completely contain (e.g., provide the outer boundary of) an aperture 138 and/or the second section 132 can completely contain (e.g., provide the outer boundary of) an aperture 138.

The mesh-style surface of the body 112 enables a user and/or pet to access the hollow inner portion of the body 112 without damaging the pet toy 100. The mesh style surface thus enables the pet toy to be enjoyed in a variety of manners. For example, pet chews can be positioned within the pet toy 100 and can improve the pet's chewing enjoyment of the toy.

In an alternative embodiment, the pet toy 100 can be formed without an aperture 136, 138, such that the first portion 130 directly attaches to the second portion 132 and this combination completely encloses the hollow inner portion of the body 112 from the outside environment.

In an embodiment, the first section 130 and the second section 132 can be simultaneously molded together, such that they are removed from a mold as one unitary piece. The first section 130 and the second section 132 can be formed, for example, from a synthetic rubber, rubber, copolymer, resin-based material, plastic and/or foam material. The first section 130 and the second section 132 can be molded in any suitable manner, for example, by injection molding, compression molding, or other methods. It should be understood from this disclosure that the first section 130 and the second section 132 can also be formed in other suitable manners beside molding.

In an embodiment, the first section 130 and the second section 132 can be formed with an inner mold and an outer mold. The inner mold can create the hollow inner portion of the body 112, and can be removed through an opening in or between the first section 130 and the second section 132 while the material is still hot, with the material elastically stretching and then returning to form.

Figure 9:
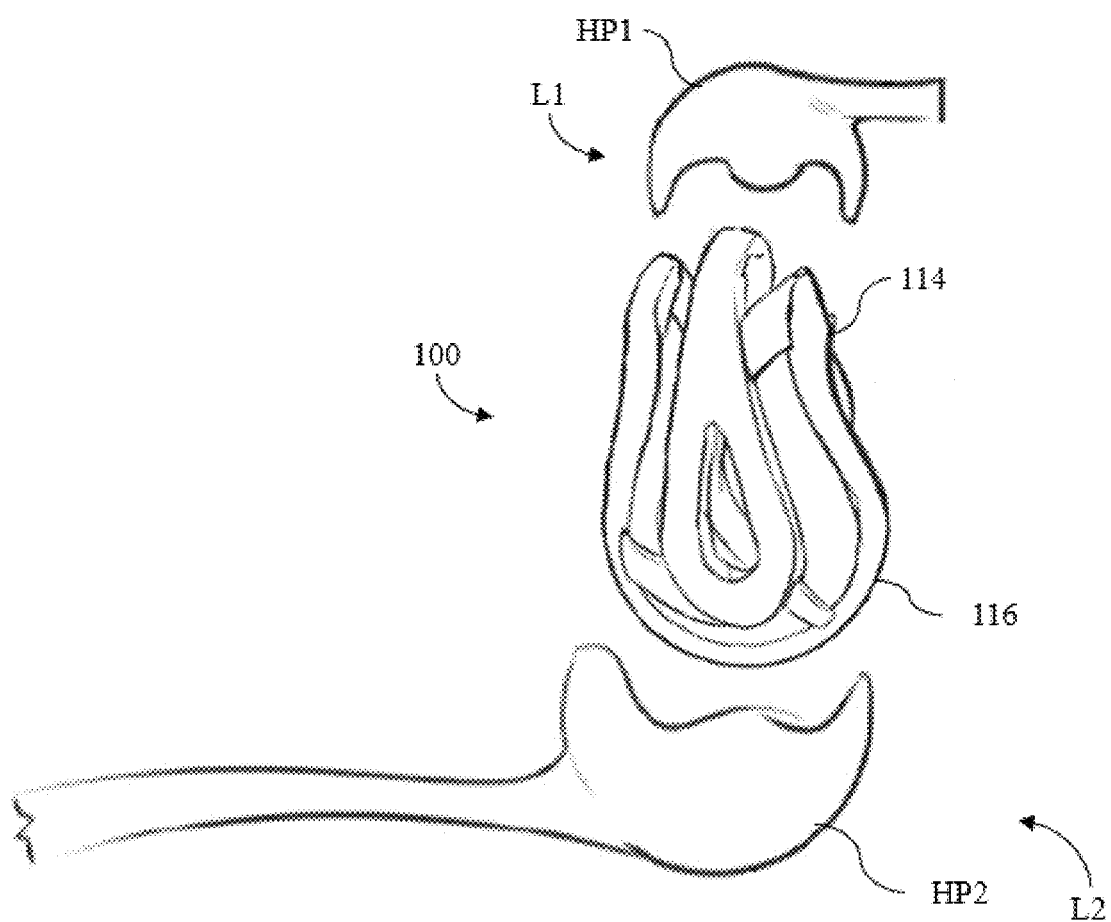
FIG. 9 illustrates how two differently sized launchers can be used in conjunction with the pet toy of FIG. 8.

Like with the pet toy 10, the pet toy 100 is capable of being used with various sized launchers, since the pet toy has two body portions 114, 116 with differing diameters. FIG. 9 illustrates an example embodiment of a system S which includes a pet toy 100 and a plurality of launchers L. More specifically, the system S includes a pet toy 100, a first launcher L1, and a second launcher L2. The first launcher L1 and the second launcher L2 can have different sizes of head portions HP which are configured to receive different sized objects. As illustrated, the first body portion 114 of the pet toy 100 is sized and configured to be received or positioned within the first head portion HP1 of the first launcher L1. The second body portion 116 of the pet toy 10 is sized and configured to be received or positioned within the second head portion HP2 of the second launcher L2.

The first launcher L1 has a first head portion HP1 with an aperture which is configured to receive and/or grip the first body portion 114. The aperture can have a width of about the first diameter D1 of the first body portion 114 of the pet toy 10. This allows the first head portion HP1 to be forced onto the first body portion 114 by a user pressing the first head portion HP1 onto the first body portion 114, thus causing an interference fit which holds the pet toy 100 within the first head portion HP1 until the user launches the pet toy 100 with a throwing motion.

The second launcher L2 has a second head portion HP2 with an aperture which is configured to receive and/or grip the second body portion 116. The aperture can have a width of about the second diameter D2 of the second body portion 116 of the pet toy 10. This allows the second head portion HP2 to be forced onto the second body portion 116 by a user pressing the second head portion HP2 onto the second body portion 116, thus causing an interference fit which holds the pet toy 100 within the second head portion HP2 until the user launches the pet toy 100 with a throwing motion.

Another advantage to the shape of the pet toy 100 shown in FIGS. 8 and 9 is that the pet toy 100 bounces in an unpredictable manner when being launched by the user and thereafter chased by a pet. A typical ball will bounce and roll generally in a straight line due to its symmetrical nature, thus enabling a pet to recover the ball with ease. The pet toy 100 of the present disclosure, on the other hand, will bounce and roll randomly, thus forcing the pet to exert more effort during a throw-and-fetch game.

Figure 10:
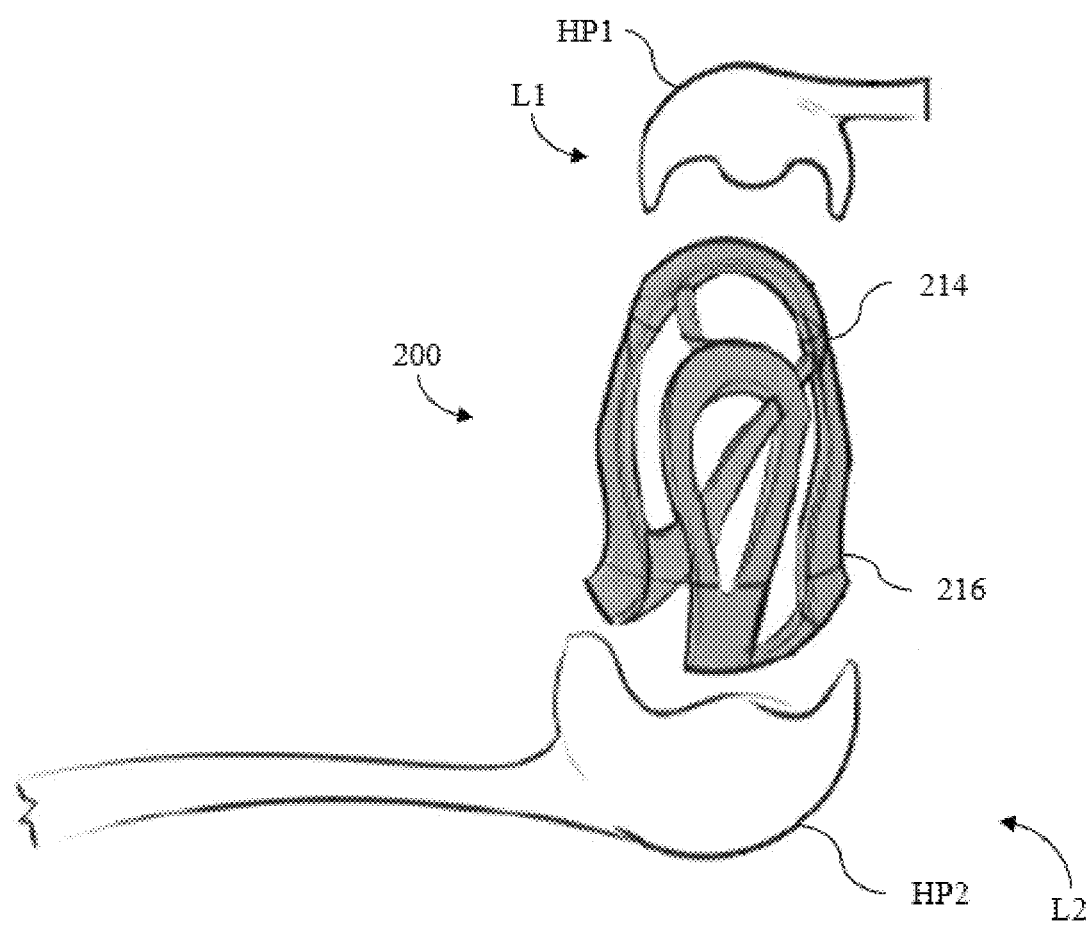
FIG. 10 illustrates how two differently sized launchers can be used in conjunction with another example embodiment of a pet toy in accordance with the present disclosure.

FIG. 10 illustrates another example embodiment of a system S which includes a pet toy 200 and a plurality of launchers L. More specifically, the system S includes a pet toy 200, a first launcher L1 having a head portion HP1, and a second launcher L2 having a head portion HP2. The difference between the pet toy 100 and the pet toy 200 is the specific configuration the first body portion 214 and the second body portion 216, demonstrating that various mesh structure embodiments fall within the scope of the present disclosure.

The embodiments described herein provide improved pet toys, methods for manufacturing improved pet toys, and/or systems including at least one launcher to launch an improved pet toy. These pet toys are advantageous, for example, because they are capable of being used with a plurality of different types or sizes of launchers and/or bounce in unpredictable directions when being launched and chased by a pet. It should be understood that various changes and modifications to the systems and methods described herein will be apparent to those skilled in the art and can be made without diminishing the intended advantages.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "section" or "portion" when used in the singular can have the dual meaning of a single part or a plurality of parts.

The term "configured" as used herein to describe a component, section or part of a device that is constructed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed:

1. A pet toy comprising:
a body consisting of a first truncated sphere and a second truncated sphere joined by a concave curved transition and forming two bulbous portions that are the only bulbous portions of the body, the first truncated sphere on a first end of the body and the second truncated sphere on an opposite second end of the body,
the first truncated sphere consisting of more than half of a first sphere that is cut off at a first truncated portion, the first truncated sphere being sized and configured to be positioned within a first launcher; and
the second truncated sphere consisting of more than half of a second sphere that is cut off at a second truncated portion, the second truncated sphere being sized and configured to be positioned within a second launcher, the second truncated sphere being a different size than the first truncated sphere,
the concave curved transition joining the first truncated sphere and the second truncated sphere at the first and second truncated portions so that the first truncated sphere and the second truncated sphere form the two bulbous portions that are the only bulbous portions of the body,
the first truncated sphere including a first portion of a first section and a first portion of a second section and the second truncated sphere including a second portion of the first section and a second portion of the second section, the first section and the second section each forming approximately half of the body on opposite sides of a first plane through the body, the first portions being located on a first side of a second plane through the body and the second portions being located on a second side of the second plane.

2. The pet toy of claim 1, wherein
the first truncated sphere has a first diameter,
the second truncated sphere has a second diameter, and
the second diameter is larger than the first diameter.

3. The pet toy of claim 2, wherein
the ratio of the first diameter to the second diameter is about 4:5.

4. The pet toy of claim 1, wherein
the first truncated sphere has a first diameter,
the second truncated sphere has a second diameter which is larger than the first diameter, and
the body has a height which extends from the first end to the opposite second end, is larger than each of the first diameter and the second diameter, and is also smaller than the combination of the first diameter and the second diameter.

5. A system comprising the pet toy of claim 1, the system further comprising:
at least one of the first launcher and the second launcher.

6. The pet toy of claim 1, wherein
each of the first truncated sphere and the second truncated sphere have an outer surface that does not include an aperture.

7. A pet toy comprising:
a body consisting of a first truncated sphere and a second truncated sphere joined by a concave curved transition and forming two bulbous portions that are the only bulbous portions of the body, the first truncated sphere on a first end of the body and the second truncated sphere on an opposite second end of the body,
the first truncated sphere consisting of more than half of a first sphere that is cut off at a first truncated portion,
the second truncated sphere consisting of more than half of a second sphere that is cut off at a second truncated portion,
the body including a first section and a second section that form the first truncated sphere and the second truncated sphere, each of the first section and the second section including a first portion and a second portion,
the first section and the second section forming the first truncated sphere on the first end of the body and the second truncated sphere on the opposite second end of the body, the first truncated sphere and the second truncated sphere each being truncated spheres of different sizes which are joined by the concave curved transition at their respective first and second truncated portions, each of the first truncated sphere and the second truncated sphere having an outer surface that does not include an aperture,
the first truncated sphere formed by the first portion of the first section and the first portion of the second section, the second truncated sphere formed by the second portion of the first section and the second portion of the second section, the first section and the second section each forming approximately half of the body on opposite sides of a first plane through the body, the first portions being located on a first side of a second plane through the body and the second portions being located on a second side of the second plane, the first truncated sphere having a first diameter taken parallel to the second plane across a widest section of the first truncated sphere, the second truncated sphere having a second diameter taken parallel to the second plane across a widest section of the second truncated sphere, and the body having a height taken along the first plane and extending from the first end to the opposite second end, the height being larger than each of the first diameter and the second diameter but smaller than the combination of the first diameter and the second diameter.

8. The pet toy of claim 7, wherein
the first section and the second section are separate pieces which are attached to each other.

9. The pet toy of claim 7, wherein
the first section and the second section have been manufactured as one unitary piece.

10. The pet toy of claim 7, wherein
the first truncated sphere has a first diameter,
the second truncated sphere has a second diameter, and
the second diameter is larger than the first diameter.

11. A method of making a pet toy, comprising:
molding a first section, the first section having a first portion and a second portion;
molding a second section, the second section having a first portion and a second portion; and
forming a body with the first section and the second section, the body consisting of a first truncated sphere and a second truncated sphere joined by a concave curved transition and forming two bulbous portions that are the only bulbous portions of the body, the first truncated sphere on a first end of the body and the second truncated sphere on an opposite second end of the body,
the first truncated sphere consisting of more than half of a first sphere that is cut off at a first truncated portion,
the second truncated sphere consisting of more than half of a second sphere that is cut off at a second truncated portion,
the first truncated sphere formed by the first portion of the first section and the first portion of the second section and the second truncated sphere formed by the second portion of the first section and the second portion of the second section, the second truncated sphere being larger than the first truncated sphere, the first section and the second section each forming approximately half of the body on opposite sides of a first plane through the body, the first portions being located on a first side of a second plane through the body and the second portions being located on a second side of the second plane, the first truncated sphere and the second truncated sphere forming the two bulbous portions that are the only bulbous portions of the body, the first truncated sphere having a first diameter taken parallel to the second plane across a widest section of the first truncated sphere, the second truncated sphere having a second diameter taken parallel to the second plane across a widest section of the second truncated sphere, and the body having a height taken along the first plane and extending between opposite ends of the body, the height being larger than each of the first diameter and the second diameter but smaller than the combination of the first diameter and the second diameter.

12. The method of claim 11, wherein
forming the body includes simultaneously molding the first section and the second section as one unitary piece.

13. The method of claim 11, wherein
molding the second section includes molding the second section separately from the first section, and
forming the body includes joining the first section to the second section.

14. The method of claim 11, wherein
molding the first section includes molding the first section within a first half of a mold,
molding the second section includes molding the second section within a second half of the mold, and
forming the body includes forming the first section and the second section together between the first half and the second half of the mold.

15. The method of claim 11, wherein
the second diameter is larger than the first diameter.

16. The method of claim 11, wherein
each of the first truncated sphere and the second truncated sphere have an outer surface that does not include an aperture.

\* \* \* \* \*